3,320,132
COMPOSITION CONTAINING 1-β-D-ARABINO-FURANOSYLCYTOSINE USEFUL IN TREATING MICE TUMORS
John S. Evans, Kalamazoo, Mich., assignor to The Upjohn Company, Kalamazoo, Mich., a corporation of Delaware
No Drawing. Filed Aug. 1, 1963, Ser. No. 299,178
3 Claims. (Cl. 167—78)

This invention relates to pharmaceutical combinations, more particularly pharmaceutical combinations comprising inhibitors of nucleic acid metabolism.

Although various inhibitors of nucleic acid metabolism are known, existing knowledge does not a priori reveal mechanisms of action and possibly beneficial applications of combinations thereof. Hence, such combinations may well result in impairment and reduction of any beneficial applications demonstrated by the individual components. Real progress of science and useful arts is promoted when the investigator unexpectedly finds that a combination of nucleic acid inhibitors provides co-operative action such that its total effect is more than the sum of the effects of the individual components. Such progress has now been brought about by the instant novel and useful combinations of nucleic acid inhibitors.

The instant inhibitors of nucleic acid metabolism are porfiromycin, also known as methylmitomycin C, mitomycin C, 6-purinethiol, and 1-β-D-arabinofuranosylcytosine. As used herein, 1-β-D-arabinofuranosylcytosine (cytosine arabinoside) means the base and its pharmaceutically acceptable acid addition salts such as those of hydrochloric, citric, succinic, maleic, tartaric, and like acids.

The invention provides novel and useful pharmaceutical combinations comprising cytosine arabinoside and a member selected from the group consisting of porfiromycin, mitomycin C, and 6-purinethiol. Suitably a pharmaceutical diluent can be added to the combinations of the principal active ingredients.

Pharmaceutical diluent means a compatible, nontoxic material suited for compounding combinations of the principal active ingredients. In combinations of the principal active ingredients for parenteral use, such as intramuscularly, intravenously, and by regional perfusion, the diluent can be a sterile aqueous vehicle containing a preservative; for example, methylparaben, propylparaben, phenol, and chlorobutanol. The aqueous vehicle can also contain sodium chloride, preferably in an amount to be isotonic; as well as a suspending agent, for example, methylcellulose and polyvinylpyrrolidone; and a surfactant, for example, polysorbate 80. 100% and 50% aqueous dimethylacetamide are operable diluents in parenteral use combinations which can be suitably further diluted extemporaneously with sterile aqueous vehicles. Similarly, aqueous solutions and suspensions can be compounded for oral use.

A finely divided powder, preferably micronized, comprising the principal active ingredients suitably diluted with lactose, for example, is also prepared for topical use. For oral administration, capsules, suitably containing appropriate diluents, for example, lactose, starch, magnesium stearate, and the like, can also be prepared. Likewise, there can be prepared a tablet suitably compounded as required with the above-mentioned appropriate pharmaceutical diluents.

The inventive pharmaceutical compositions are administered in varying dosages, depending upon the weight and condition of the mammals to be treated; the route of administration, for example, oral, parenteral, or topical; and the nature of the desired result.

The inventive compositions are useful in treating mice hosting tumors, for example, leukemia L–1210, the murine lymphoblast L–5178Y, and sarcoma 180. The compositions and processes are particularly advantageous and beneficial in prolonging survival times of such mammals. It is in these areas that the compositions and processes of the instant invention have provided especially advantageous and unexpected results.

Such results can be obtained by sequential administration of the principal active ingredients as well as by administration as a combination.

For use with leukemia, lymphomas, carcinomas, and sarcomas, the compositions of the present invention can be administered parenterally, orally, and topically. By combating the invasive cells in such afflictions the compositions prevent further multiplication and development of such cells, thereby bringing about remissions. The daily parenteral dose of porfiromycin and that of mitomycin C ranges from about 0.1 to about 5 milligrams and that of cytosine arabinoside ranges from 0.8 to about 120 milligrams. Oral unitary dosage forms such as tablets, pills, and capsules for administration once a day suitably contain from about 2.4 to about 600 milligrams of cytosine arabinoside, from about 0.3 to about 25 milligrams of porfiromycin or mitomycin C, and from about 50 to about 300 milligrams of 6-purinethiol. In pharmaceutical preparations for topical use concentrations of the principal active ingredients range from about 0.1 to about 10% by weight, depending upon the area, the type of afflicted tissue, the type of affliction, and the vehicle used. In case of local manifestations of tumors, a finely powdered combination of the principal active ingredients, preferably micronized, can be utilized in topical applications. The ratio of porfiromycin or mitomycin C to cytosine arabinoside ranges from about 1:1 to about 1:50. The ratio of cytosine arabinoside to 6-purinethiol ranges from about 3:1 to about 1:3.

The following examples describe the manner and process of making and using the invention and set forth the best mode contemplated by the inventor of carrying out the invention but are not to be constructed as limiting.

EXAMPLES—TABLE I

Combinations of cytosine arabinoside HCl and porfiromycin, leukemia 5178Y

Mice received intraperitoneal injections of L–5187 cells in aqueous saline. 24 hours later treatment with intraperitoneal injections of ¼ ml. of physiological saline solutions of the principal active ingredients was started and continued for seven days.

| Cytosine Arabinoside, mg./kg./day | Porfiromycin, mg./kg./day | Number of Mice | Median Survival Time in Days | Number of 30 Day Survivors |
|---|---|---|---|---|
| 0 | 0 | 30 | 12.5 | 0 |
| 0 | 2.5 | 20 | 15.0 | 1 |
| 0 | 5.0 | 20 | 18.5 | 0 |
| 10 | 0 | 20 | 17.0 | 0 |
| 20 | 0 | 20 | 19.0 | 0 |
| 10 | 2.5 | 20 | 22.0 | 2 |
| 20 | 2.5 | 20 | >30 | 14 |
| 10 | 5.0 | 20 | 22.0 | 1 |
| 20 | 5.0 | 20 | 24.0 | 5 |

EXAMPLES—TABLE II

Combinations of cytosine arabinoside and porfiromycin, leukemia L–1210

Mice received intraperitoneal injections of L–1210 cells in aqueous saline. 24 hours later treatment with intraperitoneal injections of ¼ ml. of physiological saline solutions of the principal active ingredients was started and continued, once daily, for seven days.

| Cytosine Arabinoside mg./kg./day | Porfiromycin, mg./kg./day | Number of Mice | Median Survival Time in Days | Number of 50 Day Survivors |
|---|---|---|---|---|
| 0 | 0 | 10 | 9.0 | 0 |
| 0 | 2.5 | 10 | 12.0 | 0 |
| 0 | 5.0 | 10 | 14.5 | 0 |
| 20 | 0 | 10 | 27.0 | 2 |
| 40 | 0 | 10 | 25.0 | 2 |
| 60 | 0 | 10 | 22.0 | 0 |
| 20 | 2.5 | 10 | >50 | 8 |
| 20 | 5.0 | 10 | 45 | 3 |
| 40 | 2.5 | 10 | >50 | 10 |
| 40 | 5.0 | 10 | >47 | 5 |
| 60 | 2.5 | 10 | 11.0 | 1 |
| 60 | 5.0 | 10 | 10.0 | 2 |

Similar results are obtained with combinations of cytosine arabinoside and mitomycin C, especially those wherein the ratio of the former to the latter is about 30:1.

EXAMPLES—TABLE III

*Combinations of cytosine arabinoside and porfiromycin, established luekemia L-1210*

Mice received intraperitoneal injections of lukemia L-1210 cells. Treatment with intraperitoneal injections of physiological saline solutions of the principal active ingredients was started 4 days later and was continued once daily for seven days.

| Cytosine Arabinoside mg./kg./day | Porfiromycin, mg./kg./day | Number of Mice | Median Survival Time in Days | Number of 50 Day Survivors |
|---|---|---|---|---|
| 0 | 0 | 10 | 9.0 | 0 |
| 0 | 2.5 | 10 | 10.5 | 0 |
| 0 | 3.75 | 10 | 10.0 | 0 |
| 0 | 5.0 | 10 | 11.0 | 0 |
| 20 | 0 | 10 | 27.5 | 0 |
| 30 | 0 | 10 | 26.0 | 0 |
| 40 | 0 | 10 | 24.0 | 0 |
| 20 | 2.5 | 10 | 26.5 | 1 |
| 30 | 3.75 | 10 | 35.5 | 2 |
| 40 | 5.0 | 10 | 25.0 | 1 |

EXAMPLE—TABLE IV

*Combinations of cytosine arabinoside and porfiromycin, leukemia 5178Y*

Mice received intraperitoneal injections of L-5178Y cells. 24 hours later oral administration was started with physiological saline solutions of the principal active ingredients and continued for 7 days.

| Cytosine Arabinoside mg./kg./day | Porfiromycin, mg./kg./day | Number of Mice | Median Survival Time in Days | Number of 50 Day Survivors |
|---|---|---|---|---|
| 0 | 0 | 10 | 13.0 | 0 |
| 30 | 0 | 10 | 15.0 | 0 |
| 0 | 5.0 | 10 | 13.5 | 0 |
| 0 | 10.0 | 10 | 13.5 | 0 |
| 0 | 20.0 | 10 | 15.0 | 0 |
| 30 | 5.0 | 10 | 18.0 | 0 |
| 30 | 10.0 | 10 | 16.5 | 0 |
| 30 | 20.0 | 10 | 19.0 | 0 |

EXAMPLES—TABLE V

*Combination of cytosine arabinoside and 6-purinethiol, recently transplanted 6-PT resistant sarcoma 180*

Sarcoma 180 in aqueous saline was implanted subcutaneously as a solid tumor in Swiss mice, 10 mice per group. 24 hours later treatment was started with intraperitoneal injections of ¼ ml. of physiological saline solutions of the principal active ingredients and continued for 7 days. The mice were sacrificed and tumors removed 24 hours after the cessation of treatment.

| Cytosine Arabinoside, mg./kg./day | 6-PT, mg./kg./day | Percent Survival | Average Change in Body Weight, gm. | Tumor Weight, mg. |
|---|---|---|---|---|
| 0 | 0 | 100 | −1.7 | 720 |
| 0 | 20 | 90 | −2.2 | 618 |
| 0 | 50 | 80 | −0.1 | 424 |
| 20 | 0 | 100 | +2.2 | 405 |
| 50 | 0 | 100 | +1.9 | 167 |
| 20 | 20 | 90 | +2.2 | 120 |
| 20 | 50 | 50 | +1.3 | 88 |
| 50 | 20 | 30 | +1.6 | 57 |
| 50 | 50 | 20 | +1.4 | 71 |

EXAMPLES—TABLE VI

*Combination of cytosine arabinoside and 6-purinethiol, established 6-PT resistant sarcoma 180*

Sarcoma 180 in aqueous saline was implanted subcutaneously as a solid tumor in Swiss mice, 10 mice per group. On the fifth day thereafter intraperitoneal treatment was started and continued for 7 days. The mice were sacrificed and tumors removed 24 hours after cessation of treatment.

| Cytosine Arabinoside, mg./kg./day | 6-PT, mg./kg./day | Percent Survival | Average Change in Body Weight, gm. | Tumor Weight,* mg. |
|---|---|---|---|---|
| 0 | 0 | 100 | −1.7 | 720 |
| 0 | 20 | 90 | −3.0 | 689 |
| 0 | 50 | 70 | −5.7 | 440 |
| 20 | 0 | 100 | −1.2 | 431 |
| 50 | 0 | 100 | +0.2 | 252 |
| 20 | 20 | 80 | −2.2 | 533 |
| 20 | 50 | 50 | −3.6 | 187 |
| 50 | 20 | 80 | −2.8 | 251 |

*The average weight of the tumors was 28 mg. at the start of treatment

EXAMPLES—TABLE VII

*Combination of cytosine arabinoside and 6-purinethiol, sarcoma 180*

Twenty mice were used in each group. The mice were treated intraperitoneally for seven consecutive days starting 24 hours after implantation of the tumor. The mice were sacrificed and tumors removed 24 hours after the last treatment.

| Cytosine Arabinoside, mg./kg./day | 6-PT, mg./kg./day | Number of Survivors | Average Change in Body Weight, gm. | Tumor Weight, mg. |
|---|---|---|---|---|
| 0 | 0 | 20 | +4.2 | 246 |
| 0 | 10 | 20 | +4.8 | 157 |
| 0 | 20 | 20 | +3.1 | 156 |
| 5 | 0 | 20 | +3.3 | 128 |
| 10 | 0 | 20 | +3.0 | 149 |
| 5 | 10 | 20 | +1.8 | 135 |
| 5 | 20 | 20 | +2.6 | 155 |
| 10 | 10 | 20 | +2.1 | 130 |
| 10 | 20 | 20 | +1.6 | 114 |

STERILE SOLUTION 1000 mls. are prepared from the following types and amounts of ingredients.

Per ml.: Gms.
8 mg. cytosine arabinoside _____ 8
1 mg. porfiromycin _____ 1
N,N-dimethylacetamide, q.s. ad. 1000 mls.

The ingredients are dissolved in the dimethylacetamide, and the solution is sterilized by filtration through a bacteria retaining filter. The sterile solution is filled into 1 ml. sterile ampoules to provide a solution suited for extemporaneous dilution with physiological saline and subsequent intravenous administration.

POWDER

A mixture of micronized cytosine arabinoside and 6-purinethiol is prepared to contain equal parts by weight. This mixture is used with beneficial results by application to the locale of surgical removal of carcinomas. Any residual invasive cells in such locale are combatted.

CAPSULES

Two-piece gelatin capsules are prepared to contain 80 mgs. of cytosine arabinoside hydrochloride and 10 mgs. of porfiromycin per capsule. Beneficial results are obtained by oral administration of one capsule per day. The leukemia cells are combatted and remission occurs.

What is claimed is:

1. A pharmaceutical preparation comprising, in combination,
    (a) 1-β-D-arabinofuranosylcytosine, and
    (b) a member selected from the group consisting of porfiromycin, mitomycin C and 6-purinethiol wherein (1) the preparation provides per day from about 0.8 mg./kg. to about 120 mg./kg. of the 1-β-D-arabinofuranosylcytosine and (2) the ratio of the 1-β-D-arabinofuranosylcytosine to the member is from about 1:4 to about 30:1.
2. The pharmaceutical preparation of claim 1 wherein the ratio of the 1-β-D-arabinofuranosylcytosine to the porfiromycin is from about 1.5:1 to about 16:1.
3. The preparation of claim 2 wherein the ratio of the 1-β-D-arabinofuranosylcytosine to the porfiromycin is about 8:1.

References Cited by the Examiner

Chemical Abstracts 56: 4049g (1962).

Evans et al.: Cancer Chemotherapy Abstracts, vol. 2, No. 3, 1961, pp. 228–9 (No. 866).

Shiba et al.: Cancer Chemotherapy Abstracts, vol. 1, No. 4, 1960, page 255 (No. 1256).

The Merck Index of Chemicals and Drugs, seventh edition, Merck and Co., Inc., Rahway, N.J., page 648, 1960.

ALBERT T. MEYERS, *Primary Examiner.*

SAM ROSEN, *Examiner.*

JEROME D. GOLDBERG, *Assistant Examiner.*